E. KNIGHT.
DEVICE FOR LIFTING WORK INTO AND OUT OF LATHES.

No. 195,220. Patented Sept. 18, 1877.

Witnesses:

Inventor:
Ellis Knight

UNITED STATES PATENT OFFICE.

ELLIS KNIGHT, OF EVANSTON, WYOMING TERRITORY, ASSIGNOR TO WILLIAM SELLERS, OF PHILADELPHIA, PENNSYLVANIA.

IMPROVEMENT IN DEVICES FOR LIFTING WORK INTO AND OUT OF LATHES.

Specification forming part of Letters Patent No. 195,220, dated September 18, 1877; application filed August 16, 1877.

*To all whom it may concern:*

Be it known that I, ELLIS KNIGHT, of the town of Evanston, county of Uintah, in the Territory of Wyoming, have invented certain new and useful Devices for Lifting Work into and out of Double Face-Plate Lathes; and I declare the following to be a full and exact description thereof, reference being had to the accompanying drawings, forming part of this specification, in which—

Figure 2:
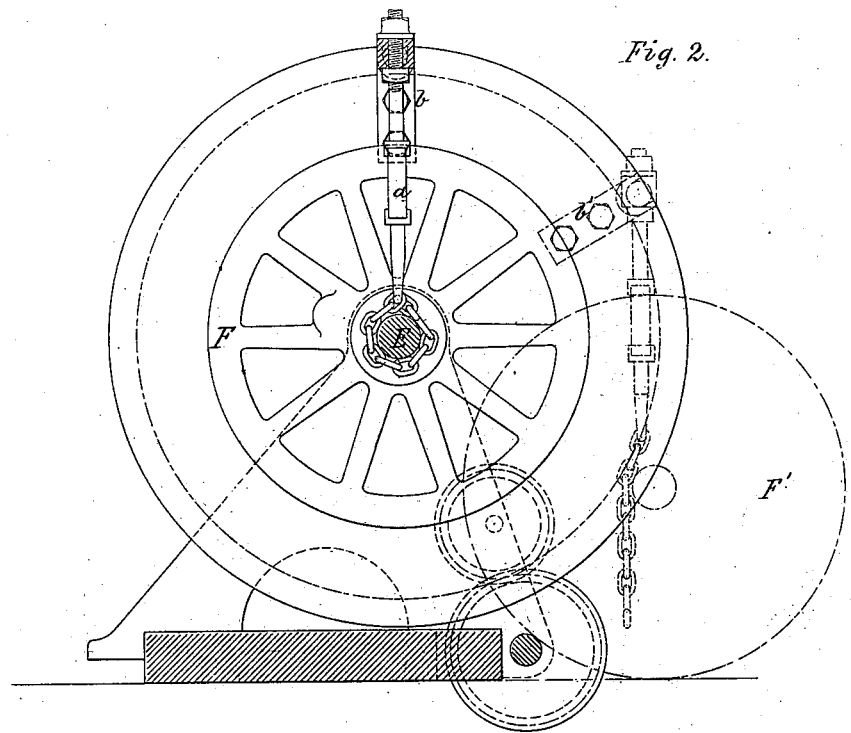
Figure 1:
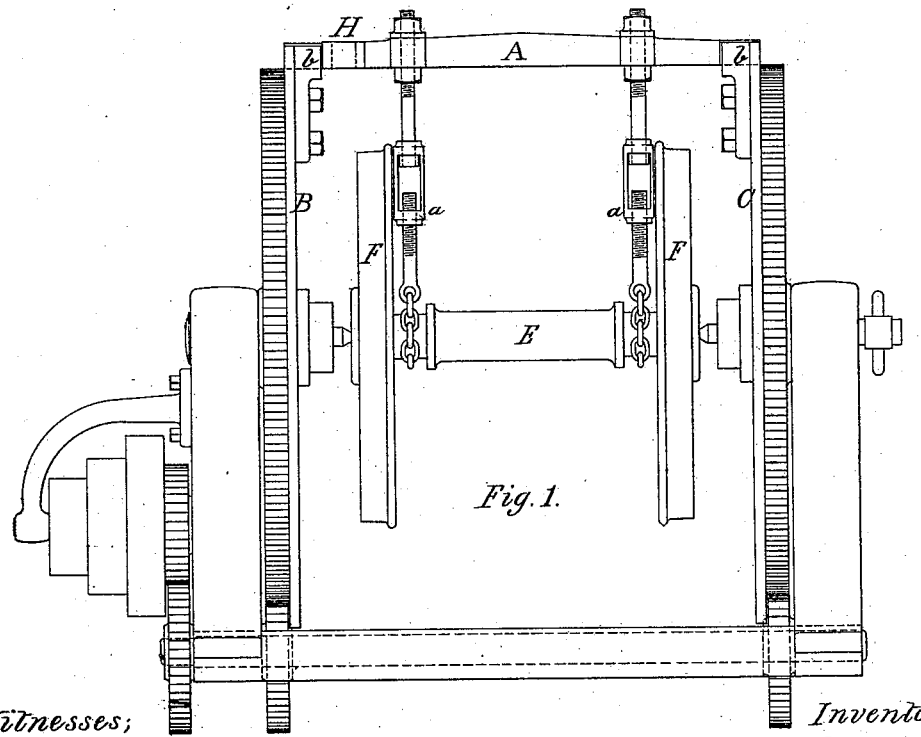

Figure 1 is a side elevation, and Fig. 2 an end elevation, of my improvements, shown attached to a lathe.

The objects of my invention are to provide a means of lifting work into and out of large lathes by the driving-power of the lathe itself; to dispense with the use of cranes, hydraulic or screw jacks, or any expensive apparatus commonly used for the purpose; and to reduce the labor required, as by means of my invention one man can do the work formerly requiring several.

My invention consists of a cross-bar resting in suitably-formed bearings in the face-plates of a lathe, from which the work to be handled is suspended by chains or hooks.

It further consists in providing a means of adjustment, so that the work may be slightly raised or lowered to bring its center in line with the centers of the lathe.

In the accompanying drawing, A represents a cross-bar, resting in the two stands $b\ b$, bolted to the face-plates B and C. The cross-bar A also takes a bearing in recesses in the face-plates themselves; and it is evident that if the face-plates are properly made the stands $b\ b$ may be dispensed with. The cross-bar A is provided with two screw-swivels, $a\ a$, furnished with chains at their lower ends, by which the axle E, with wheels F F, is slung to the cross-bar A. The upper ends of these swivels $a\ a$ may pass through the cross-bar, as shown, and be secured by nuts, or they may be hooked over the cross-bar, or attached in any other convenient manner.

My invention is operated as follows: The wheels to be lifted are rolled close to the shear or bed of the lathe, and between the face-plates, as shown dotted in F, Fig. 2. The lathe is then turned so as to bring the stands $b\ b$ or recesses in the face-plates into the position shown at $b'$, the cross-bar A is lifted into place, and the chains secured around the axle E. If the lathe be now set in motion, the wheels and axle will be lifted into the position shown by the full lines in Fig. 2. The screw-swivels are now turned slightly, if required, to bring the centers of the axle to the exact height of the lathe-centers, and the spindle run out, so as to carry the weight. The swivels are now loosened, the chains cast off, and the cross-bar A taken down, the whole operation being readily done by one man. To take the wheels out, the above operation is, of course, reversed.

The same apparatus can be used for hoisting single wheels or any heavy work into the lathe.

Having now described my invention, what I claim as new, and desire to secure by Letters Patent, is—

The cross-bar A and adjustable screw-swivels $a\ a$, in combination with the face-plates B and C, substantially as and for the purposes described.

ELLIS KNIGHT.

Witnesses:
   A. C. BECKWITH,
   EDWARD W. SMITH,
   MICHAEL MAST.